United States Patent
Camp

(10) Patent No.: US 11,082,447 B2
(45) Date of Patent: Aug. 3, 2021

(54) SYSTEMS AND METHODS FOR PREVENTING ROUTER ATTACKS

(71) Applicant: Indiana University Research and Technology Corporation, Indianapolis, IN (US)

(72) Inventor: L. Jean Camp, Bloomington, IN (US)

(73) Assignee: Indiana University Research and Technology Corporation, Indianapolis, IN (US)

(*) Notice: Subject to any disclaimer, the term of this patent is extended or adjusted under 35 U.S.C. 154(b) by 429 days.

(21) Appl. No.: 15/999,673

(22) PCT Filed: Feb. 17, 2017

(86) PCT No.: PCT/US2017/018299
§ 371 (c)(1),
(2) Date: Aug. 20, 2018

(87) PCT Pub. No.: WO2017/143137
PCT Pub. Date: Aug. 24, 2017

(65) Prior Publication Data
US 2021/0037052 A1    Feb. 4, 2021

Related U.S. Application Data

(60) Provisional application No. 62/297,896, filed on Feb. 21, 2016.

(51) Int. Cl.
*H04L 29/06* (2006.01)
*G06N 20/00* (2019.01)
*G06N 7/00* (2006.01)

(52) U.S. Cl.
CPC ......... *H04L 63/1466* (2013.01); *G06N 7/005* (2013.01); *G06N 20/00* (2019.01); *H04L 63/1425* (2013.01)

(58) Field of Classification Search
CPC . H04L 63/1466; H04L 63/1425; G06N 20/00; G06N 7/005
See application file for complete search history.

(56) References Cited

U.S. PATENT DOCUMENTS

| | | |
|---|---|---|
| 5,822,301 A | 10/1998 | Arnold et al. |
| 2007/0297405 A1 | 12/2007 | He |
| 2013/0159221 A1 | 6/2013 | Thompson |
| 2018/0359259 A1* | 12/2018 | Leon .............. H04L 63/0428 |
| 2019/0386957 A1* | 12/2019 | Leon .............. H04L 63/0245 |

OTHER PUBLICATIONS

International Search Report and Written Opinion issued by the ISA/US, Commissioner for Patents, dated May 8, 2017, for International Application No. PCT/US2017/018299; 7 pages.

* cited by examiner

*Primary Examiner* — Arvin Eskandarnia
(74) *Attorney, Agent, or Firm* — Faegre Drinker Biddle & Reath LLP

(57) ABSTRACT

A system comprising a processor in electrical communication with a network and a non-transitory memory having instructions that, in response to an execution by the processor, cause the processor to monitor a routing information base ("RIB") of the network, identify a change in the RIB, calculate a probability of suspiciousness of the change in the RIB, and classify the change in the RIB based on a continuum of trust are disclosed. Methods of managing routers are also disclosed.

18 Claims, 2 Drawing Sheets

SYSTEMS AND METHODS FOR PREVENTING ROUTER ATTACKS

CROSS-REFERENCE TO RELATED APPLICATIONS

This application is a U.S. National Stage under 35 U.S.C. § 371 of International Patent Application No. PCT/US2017/018299, filed Feb. 17, 2017, which claims the benefit of U.S. Provisional Application No. 62/297,896, filed Feb. 21, 2016, the entire disclosures each of which is hereby expressly incorporated by reference in its entirety.

GOVERNMENT SUPPORT

This invention was made with government support under N66001-12-C-0137 awarded by the Department of Homeland Security. The government has certain rights in the invention.

FIELD OF THE DISCLOSURE

This disclosure relates systems and methods for preventing router attacks. More specifically, this disclosure relates to machine learning and artificial intelligence systems and methods for preventing router attacks and managing routers.

BACKGROUND

Conventionally, routing tables are data tables stored in a networked computer or router that lists routes to destinations within a network that aid in determining routing protocols. Various metrics may also be associated with particular routes, such as distance, and may be used to minimize delays in communication across the network. Thus, routing tables may contain topographical information about the network.

The information in routing tables, such as the topographical information, may be accomplished using stable routes (e.g., static routes) or meta-stable routes. While some stable routes may be static and entered by non-automatic means, much of the information in routing tables is not fixed and is collected through various methods or procedures of topological discovery.

When exchanging information over a network, the routing table must first know where to send the "packet" of information. Whenever a node needs to send data (a packet of information) to another node, the destination must first be determined. If the ultimate destination node cannot connect directly to the sending node, the sending node must pass the packet of information to one or more intermediate nodes. While some nodes may try to determine which routes will work, many nodes do not try to determine what routes might work and, thus, will send the packet to a gateway in the network. The gateway will then decide the route to send the packet in an effort to ensure that the packet will arrive at the correct final destination.

Routing tables or routing information base (RIB) help to aid the gateway in determining which way to deliver various packets of data. Routing tables can be understood as a database that keeps track of various pathways—similar to a flight route map for an airline—and provides this information to various nodes requesting routing information. The routing data that forms the routing table is typically stored in RAM that contains network/next hub information. Various algorithms can be used to determine optimal routes and sometimes historical routing information can be used.

However, through the use of routing tables, routers are susceptible to attack by third parties, such as with IP hijacking. IP hijacking, border gateway protocol (BGP) hijacking, or route hijacking—versions of the classic man-in-the-middle attack—can be understood as the illegitimate takeover of groups of IP addresses by corrupting internet routing tables. After rerouting the packets, the packets are then sent to their legitimate destinations. This type of attack is less likely to be noticed—by either the sender or the recipient—than some other types of attacks. Once the data is hijacked, the perpetrator can copy and then comb through the data (e.g., reading emails, spreadsheets, credit card numbers, access confidential information) and capture a vast amount of information.

Thus, while the aforementioned techniques do not attack a bug or flaw in border gateway protocol ("BGP"), it takes advantage of the fact that the BGP's architecture is inherently trust-based. BGP can be considered trust-based because each router distributes notices indicating which IP addresses they are most suited to deliver to—in other words, for IP addresses for which they are the quickest, most efficient route. However, BGP routers often assume that when another router states that it is the best node for the best path to a specific IP address, it is telling the truth. The trust—or gullibility—can make current routers susceptible to attack and send packets to routers that should not receive the packets.

In some cases, router hijacks can last for only a short duration and, in other instances, they can last for long periods of time (e.g., months).

A need therefore exists to address router attacks, such as BGP attacks, and help to ensure data sent via the internet is more secure. A need also exists for methods and systems that use machine learning or artificial intelligence to help prevent router attacks.

SUMMARY

In some embodiments, systems may include a processor in electrical communication with a network, and a non-transitory memory having instructions that, in response to an execution by the processor, cause the processor to monitor a routing information base ("RIB") of the network, identify a change in the RIB, calculate a probability of suspiciousness of the change in the RIB, and classify the change in the RIB based on a continuum of trust. Such systems may be incorporated into or be a part of a router and/or a network. In various embodiments, the non-transitory memory having instructions that, in response to an execution by the processor, cause the processor to generate a decision based on the classification.

Some embodiments may include systems that are configured to customize the RIB from one point of view in the network. In some embodiments, the system may be configured to classify the RIB from a first point of view in a network. In various embodiments, the classification of the change in the RIB may include evaluating both networking and external information.

Some embodiments include systems where the system is configured to use machine learning to classify the change in the RIB information. Machine learning may include at least one of Random Forrest, K-Nearest Neighbors, C4.5, a decision table, a Navie Bayes Tree, Simple Logistic, or combinations thereof, in various embodiments. Networking information include at least one of rate of change in a route, the number of routes affected by a change, whether a change was a static change or a dynamic change, a characteristic of an internet service provider (ISP) affected by the change, or combinations thereof.

A characteristic of an internet service provider (ISP) may include at least one of size of the ISP, jurisdiction identification of the ISP, history of the ISP, competency level of the ISP, or combinations thereof.

External information may include, in some embodiments, geographical estimates, adjacency, network scale, market data, use data, path length, or combinations thereof.

In some aspects or embodiments, the decision may include delaying the adoption of the change, refusal to distribute the change, rejection of the change, ceasing to send information via the changed route, delaying sending information via the changed route, alerting an operator, requesting an evaluation from an operator, or combinations thereof.

Various methods of managing a router include monitoring, by a processor, a routing information base ("RIB") of a network, identifying, by the processor, a change in the RIB, calculating, by the processor, a probability of suspiciousness of the change in the RIB, and classifying the change in the RIB based on a continuum of trust.

Various methods may include methods where the processor is configured to use machine learning to classify the change in the RIB information and/or the processor is configured to classify, change, or both classify and change the RIB from a first point of view in a network. In some embodiments, the learning model may comprise Random Forrest, K-Nearest Neighbors, C4.5, a decision table, a Navie Bayes Tree, Simple Logistic, or combinations thereof.

In some embodiments, the classifying the change in the RIB may include evaluating both networking and external information.

In some embodiments, the methods may include methods where the networking information includes at least one of rate of change in a route, the number of routes affected by a change, whether a change was a static change or a dynamic change, a characteristic of an internet service provider (ISP) affected by the change, or combinations thereof.

Also disclose are various non-transitory computer-readable data storage media comprising instructions that, when executed by a processor, cause the processor to perform acts including monitoring a routing information base ("RIB") of a network, identifying a change in the RIB, calculating a probability of suspiciousness of the change in the RIB, and classifying the change in the RIB based on a continuum of trust.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein.

Figure 1:
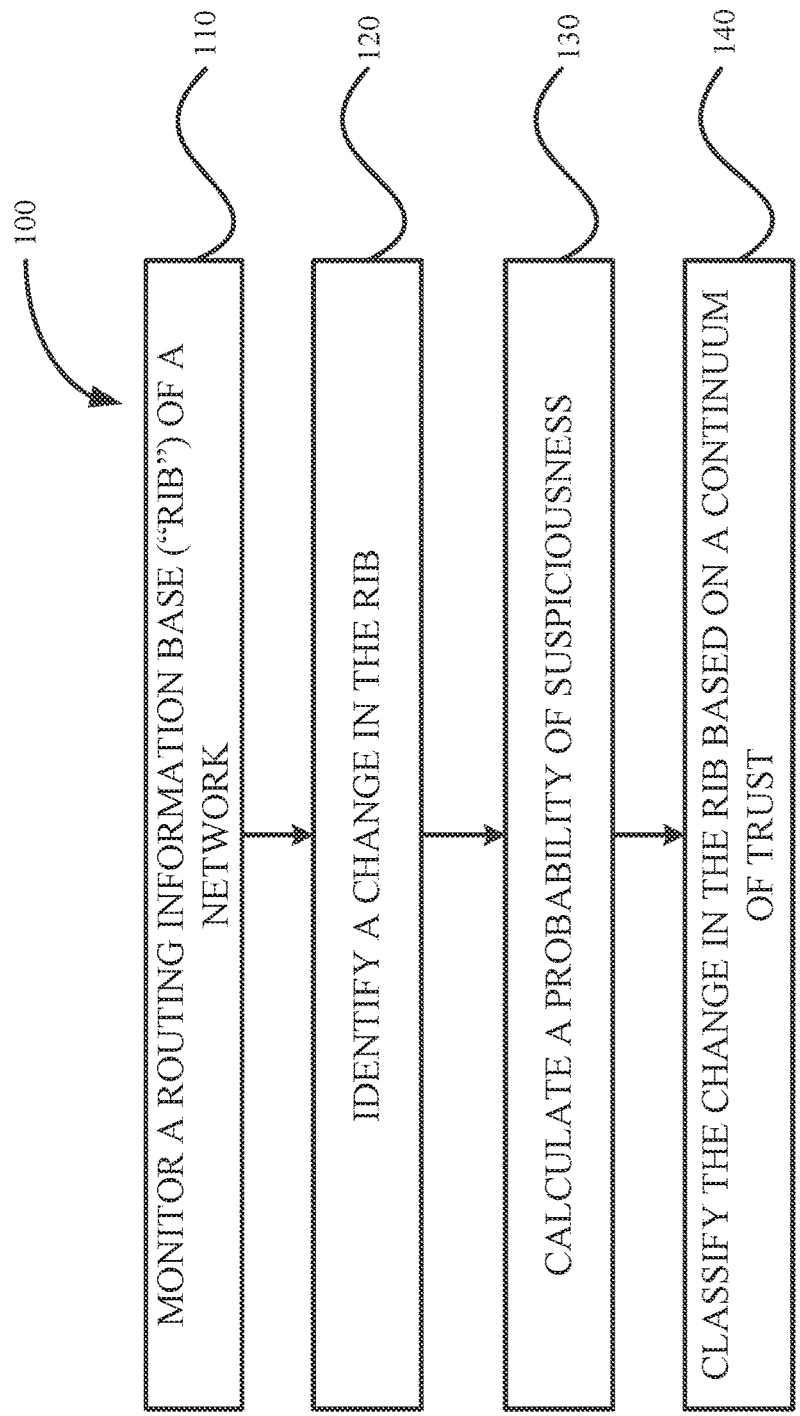
FIG. 1 illustrates a method of managing a router according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION

The embodiment disclosed below is not intended to be exhaustive or limit the disclosure to the precise form disclosed in the following detailed description. Rather, the embodiments are chosen and described so that others skilled in the art may utilize its teachings.

One of ordinary skill in the art will realize that the embodiments provided can be implemented in hardware, software, firmware, and/or a combination thereof. Programming code according to the embodiments can be implemented in any viable programming language such as C, C++, HTML, XTML, JAVA or any other viable high-level programming language, or a combination of a high-level programming language and a lower level programming language.

In FIG. 1, method 100 of managing a router is illustrated according to various embodiments. Method 100 may include monitoring, by a processor (e.g., the processor shown in FIG. 2), a routing information base ("RIB") of a network (step 110), identifying, by the processor, a change in the RIB (step 120), calculating, by the processor, a probability of suspiciousness of the change in the RIB (step 130), and classifying the change in the RIB based on a continuum of trust (step 140).

Method 100 is not particularly limited and may use, for example, various artificial intelligence or machine learning models. For example, in various embodiments, the classifying the change in the RIB may be processed with a learning model. Various exemplary learning models include Random Forrest, K-Nearest Neighbors, C4.5, a decision table, a Navie Bayes Tree, Simple Logistic, or combinations thereof. The incorporation of graph heuristics also falls within the scope of this disclosure.

The learning model is not limited and may use a variety of known models and information. For example, in various embodiments the classifying the change in the RIB may include evaluating both networking information and external information. Exemplary networking information include at least one of rate of change in a route, the number of routes affected by a change, whether a change was a static change or a dynamic change, a characteristic of an internet service provider (ISP) affected by the change, or combinations thereof. Exemplary external information includes geographical estimates, adjacency, network scale, market data, use data, path length, or combinations thereof.

In vary embodiments, the processor of method 100 may be configured to classify, change or both classify and change the RIB from a first point of view in a network.

Furthermore, method 100 is not particularly limited in scope and may be used to manage a router, manage a plurality of routers, manage a portion of a network, or manage a network.

Figure 2:
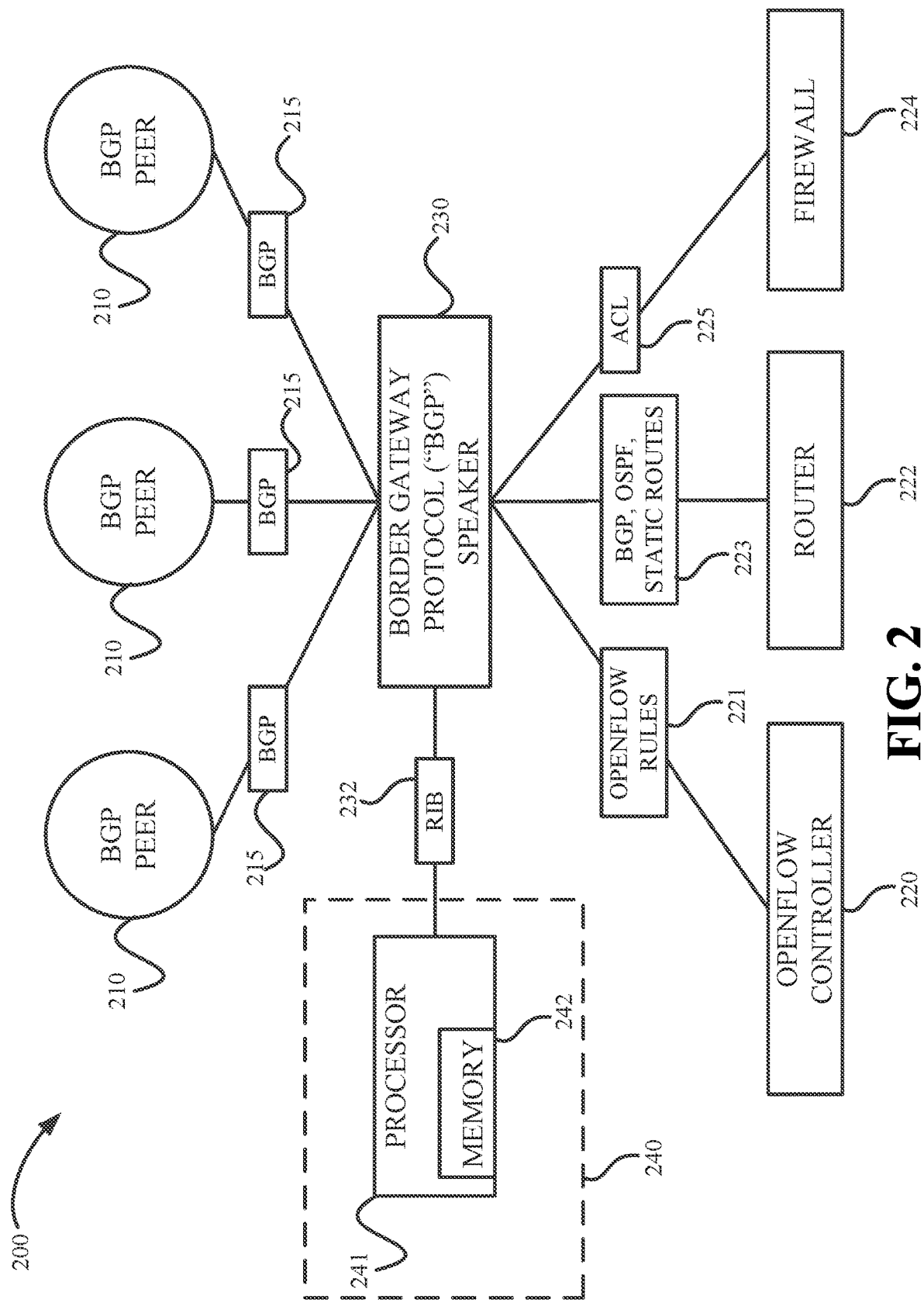
FIG. 2 illustrates a system configured to classify the change in the routing information base ("RIB") based on a continuum of trust according to various embodiments.

FIG. 2 illustrates exemplary system 240 connected to network 200. Network 200 may comprise a plurality of border gateway protocol (BGP) Peers 210. As used herein, the term BGP Peers may be understood to be a BGP neighbors. BGP Peers may comprise BGPs 215 and may be connected to a BGP speaker 230, which may be in electrical communication with router information base ("RIB") 232.

Moreover, BGP speaker 230 may be connected to OpenFlow Controller 220, router 222, and firewall 224.

Furthermore, system 240 may comprise processor 241 and non-transitory memory 242, which may be in electrical communication with the RIB 232, the BGP speaker 230, OpenFlow Controller 220, router 222, firewall 224, and network 200.

Communication with OpenFlow Controller 220 may allow for the implementation of path reverse and/or path forwarding using OpenFlow switches based on the known valid routes with OpenFlow rules 221. In some embodiments, it has been found that focusing on Tier 2 providers and dropping paths in social defined networks ("SDN") could have a high degree of efficacy in defeating amplification attacks.

Router 222 may be controlled by various protocols 223, such as BGP, Open Shortest Path First ("OSPF"), static routes, or combinations thereof. As used herein, OSPF may be understood to include an interior gateway protocol (IGP) for routing Internet Protocol (IP) packets solely (e.g., within a single routing domain, such as an autonomous system). OSPF may link state information from available routers and construct a topology map of the network. The topology may be presented within RIB 232 to the Internet Layer which routes datagrams based solely on the destination IP address found in IP packets.

In various embodiments, system 240 may include a processor 241 that is in electrical communication with network 200, and a non-transitory memory 242 having instructions that, in response to an execution by the processor 241, cause the processor 241 to monitor a routing information base ("RIB") 232 of the network, identify a change in the RIB, calculate a probability of suspiciousness of the change in the RIB 232, and classify the change in the RIB 232 based on a continuum of trust. Thus, the various embodiments disclosed herein are capable of recognizing and accounting for geographical, economic, political and technical challenges of BGP.

This includes recognizing that routes and updates may be considered trusted, partially trusted, or not trusted. Thus, in various embodiments, a continuum of trust can be created, wherein each operator that uses system 240 may be able to select a customized risk tolerance based on their individual or organizational risk tolerance. Accordingly, system 240 may be configured to classify, customize, or both classify and customize the change to the RIB from a first point of view in a network. Thus, various embodiments may include a system that is configured to use machine learning to classify the change in the RIB information.

In various embodiments, the classification of the change in the RIB may include evaluating both networking and external information. Exemplary networking information may include at least one of rate of change in a route, the number of routes affected by a change, whether a change was a static change or a dynamic change, a characteristic of an internet service provider (ISP) affected by the change, or combinations thereof. Exemplary characteristics of an ISP may include at least one of size of the ISP, jurisdiction identification of the ISP, history of the ISP, competency level of the ISP, or combinations thereof.

External information may include, for example, macroeconomics, geographical estimates, adjacency, network scale, market data, use data, path length, macro BGP attacks, or combinations thereof.

The use of black lists and white lists of known IPs may also be included in various embodiments of the present disclosure. As used herein, the term "blacklist" may be understood as a reference to lists compiled by router manufacturers, trusted third parties, and social networks of friends identifying fake or compromised routes.

As used herein, the term "whitelist" may include a list or register of routers, routes, or nodes that are being provided a particular privilege, service, mobility, access or recognition. Entities on the list may be accepted, approved and/or recognized with a lower risk tolerance. In other words, whitelisting may include the reverse of blacklisting, the practice of identifying routers, routes, or nodes that are denied, unrecognized, or ostracized. Accordingly, the risk tolerance of an organization may vary by types and classification of changes to routes (e.g., presence on a whitelist or blacklists) and known legitimate routes.

Thus, in various embodiments, BGP Speaker 230 may be placed in a location at the edge of the network 200 where it can recognize a bad route but it cannot prevent it from propagating, the identified bad routes can be converted into an access control list ("ACL") 225 entry for a firewall that prevents traffic destined to any prefix affected by the hijack.

The machine learning is not particularly limited and may include at least one of Random Forrest, K-Nearest Neighbors, C4.5, a decision table, a Navie Bayes Tree, Simple Logistic, or combinations thereof.

Furthermore, non-transitory memory 242 may have instructions that, in response to an execution by the processor 241, cause the processor 241 to generate a decision based on the classification. Various decisions include delaying the adoption of the change, refusal to distribute the change, rejection of the change, ceasing to send information via the changed route, delaying sending information via the changed route, alerting an operator, requesting an evaluation from an operator, or combinations thereof.

Accordingly, various systems may be used to select risk tolerance from both local evaluations, global evaluations or any combination thereof. The server may be configured to build the decision making components that inform the clients, locally, of which actions to take based on the classification of a change in the RIB based on a continuum of trust.

Thus, in various embodiments, the processor may be configured to generate a decision based on the classification. Various exemplary decisions include delaying the adoption of the change, refusal to distribute the change, rejection of the change, ceasing to send information via the changed route, delaying sending information via the changed route, alerting an operator, requesting an evaluation from an operator, or combinations thereof.

In various embodiments, the decision made by processor 241 of system 240 may be customizable based on the risk tolerance of the end user (e.g., an organization such as a department, corporation, or governmental agency). Thus, individual organizations may be enabled to make their own decisions about how to respond to changes in the network topology. This can be furthered by implementing the various machine learning methods disclosed herein along with various algorithms to facilitate automation and support decision-making. Various embodiments disclosed herein, could be customized by larger ISPs, yet may still be easily adopted by smaller ISPs. This would facilitate and permit human intervention while efficiently and proactively preventing router attacks, which previously have gone unnoticed for long periods of time.

Also disclosed herein are various non-transitory computer-readable data storage mediums comprising instructions that, when executed by a processor, cause the processor to perform acts comprising monitoring a routing information base ("RIB") of a network, identifying a change in the RIB, calculating a probability of suspiciousness of the change in the RIB, and classifying the change in the RIB based on a continuum of trust.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system comprising:
    a processor in communication with a network; and
    a non-transitory memory having instructions that, when executed by the processor, cause the processor to:
        monitor a routing information base (RIB) of the network;
        identify a change in the RIB;
        calculate a probability of suspiciousness of the change in the RIB; and
        classify the change in the RIB based on a continuum of trust, wherein classifying the change in the RIB includes evaluating both networking information related to the network and external macro factors that affect the network.

2. The system of claim 1, wherein the instructions, when executed by the processor, further cause the processor to classify the change in the RIB from a first point of view in the network.

3. The system of claim 1, wherein the instructions, when executed by the processor, further cause the processor to use machine learning to classify the change in the RIB.

4. The system of claim 3, wherein the machine learning includes one or more of: a random forest, k nearest neighbor, C4.5, a decision table, a naive Bayes tree, and simple logistic.

5. The system of claim 1, wherein the networking information include one or more of: a rate of change in a route, a number of routes affected by the change, whether the change was astatic or dynamic, and a characteristic of an internet service provider (ISP) affected by the change.

6. The system of claim 5, wherein the characteristic of the ISP includes one or more of: a size of the ISP, a jurisdictional identification of the ISP, a history of the ISP, and a competency level of the ISP.

7. The system of claim 1, wherein external macro factors include one or more of: macroeconomic factors, geographical estimates, adjacency, network scale, market data, use data, and path length.

8. The system of claim 1, wherein the instructions, when executed by the processor, further cause the processor to generate a decision based on classifying the change in the RIB.

9. The system of claim 8, wherein the generated decision includes one or more of: delaying adoption of the change, refusing to distribute the change, rejecting the change, ceasing to send information via a route affected by the change, delaying sending information via the route affected by the change, alerting an operator, and requesting an evaluation from the operator.

10. The system of claim 1, wherein the system is incorporated into a router.

11. The system of claim 1, wherein the system is a part of the network.

12. The system of claim 1, wherein the instructions, when executed by the processor, further cause the processor to customize the RIB from one point of view in the network.

13. A method comprising:
    monitoring, by a processor, a routing information base (RIB) of a network;
    identifying, by the processor, a change in the RIB;
    calculating, by the processor, a probability of suspiciousness of the change in the RIB; and
    classifying, by the processor, the change in the RIB based on a continuum of trust wherein classifying the change in the RIB includes evaluating both networking information related to the network and external macro factors that affect the network.

14. The method of claim 13, wherein classifying the change in the RIB includes using machine learning to classify the change in the RIB.

15. The method of claim 13, wherein classifying the change in the RIB includes classifying the change in the RIB from a first point of view in the network.

16. The method of claim 14, wherein the machine learning includes one or more of: a random forest, k-nearest neighbor, C4.5, a decision table, a naive Bayes tree, and simple logistic.

17. The method of claim 13, wherein the networking information include one or more of: a rate of change in a route, a number of routes affected by the change, whether the change was static or dynamic, and a characteristic of an internet service provider (ISP) affected by the change.

18. A non-transitory computer-readable storage medium having instructions that, when executed by a processor, cause the processor to:
   monitor a routing information base (RIB) of a network;
   identify a change in the RIB;
   calculate a probability of suspiciousness of the change in the RIB; and
   classify the change in the RIB based on a continuum of trust, wherein classifying the change in the RIB includes evaluating both networking information related to the network and external macro factors that affect the network.

* * * * *